United States Patent
Kadakia et al.

(10) Patent No.: US 10,419,415 B2
(45) Date of Patent: Sep. 17, 2019

(54) CENTRALIZED AUTHENTICATION AND REPORTING TOOL

(71) Applicant: Bank of America Corporation, Charlotte, NC (US)

(72) Inventors: Apurva R. Kadakia, Plainsboro, NJ (US); Venumadhav Mididoddi, Bordentown, NJ (US)

(73) Assignee: Bank of America Corporation, Charlotte, NC (US)

( * ) Notice: Subject to any disclaimer, the term of this patent is extended or adjusted under 35 U.S.C. 154(b) by 184 days.

(21) Appl. No.: 15/353,146

(22) Filed: Nov. 16, 2016

(65) Prior Publication Data
US 2018/0139201 A1 May 17, 2018

(51) Int. Cl.
*H04L 29/06* (2006.01)
*G06Q 40/06* (2012.01)

(52) U.S. Cl.
CPC ......... *H04L 63/0807* (2013.01); *G06Q 40/06* (2013.01); *H04L 63/083* (2013.01)

(58) Field of Classification Search
CPC .... H04L 63/0807; H04L 63/083; G06Q 40/06
See application file for complete search history.

(56) References Cited

U.S. PATENT DOCUMENTS

| | | | | |
|---|---|---|---|---|
| 6,567,796 B1* | 5/2003 | Yost | .................... | H04L 41/5035 |
| 6,601,234 B1* | 7/2003 | Bowman-Amuah | ........................ | G06Q 10/06375 |
| | | | | 717/108 |
| 7,475,032 B1* | 1/2009 | Patnode | .................. | G06Q 30/02 |
| | | | | 705/35 |
| 7,603,301 B1* | 10/2009 | Regan | .................... | G06Q 10/10 |
| | | | | 705/30 |
| 7,774,271 B1* | 8/2010 | Edwards | ................ | G06Q 20/10 |
| | | | | 705/38 |
| 8,601,367 B1* | 12/2013 | Ritz | ....................... | G06Q 10/00 |
| | | | | 715/234 |
| 9,424,333 B1* | 8/2016 | Bisignani | .............. | G06F 16/283 |
| 9,489,410 B1* | 11/2016 | Turner | .............. | G06F 16/24578 |
| 9,792,782 B1* | 10/2017 | Basu | ..................... | G07F 19/203 |
| 2003/0046209 A1* | 3/2003 | Brandenberger | ...... | G06Q 40/06 |
| | | | | 705/36 R |
| 2003/0050936 A1* | 3/2003 | Wainwright | ......... | G06Q 10/087 |
| 2005/0055239 A1* | 3/2005 | Farmer | .................. | G06Q 10/06 |
| | | | | 705/7.11 |

(Continued)

*Primary Examiner* — David Garcia Cervetti
(74) *Attorney, Agent, or Firm* — Michael A. Springs

(57) ABSTRACT

A system includes a retrieval engine, an authentication engine, an extraction engine, a determination engine, and an export engine. The retrieval engine receives a request for a data report from a user via a user device. The retrieval engine receives reporting data from one or more data servers. The authentication engine determines whether the user is authorized to receive the customized data based on an authentication token. The extraction engine configured to extract one or more report requirements from the request and extract customized data from the reporting data based on report requirements and metadata. The determination engine determines one or more presentation generation tools based on the report requirements and the customized data. The export engine communicates the customized data and a routine to the one or more presentation generation tools.

17 Claims, 3 Drawing Sheets

(56) References Cited

U.S. PATENT DOCUMENTS

| | | | | |
|---|---|---|---|---|
| 2005/0202390 A1* | 9/2005 | Allen | | G09B 7/00 |
| | | | | 434/353 |
| 2007/0174193 A1* | 7/2007 | Quan | | G06F 21/41 |
| | | | | 705/44 |
| 2007/0244775 A1* | 10/2007 | Linder | | G06Q 40/00 |
| | | | | 705/35 |
| 2008/0294713 A1* | 11/2008 | Saylor | | H04L 41/5054 |
| | | | | 709/202 |
| 2009/0319440 A1* | 12/2009 | Montgomery | | G06Q 40/06 |
| | | | | 705/36 R |
| 2010/0138316 A1* | 6/2010 | Connors | | G06F 21/57 |
| | | | | 705/26.1 |
| 2010/0161344 A1* | 6/2010 | Dyson | | G06F 16/242 |
| | | | | 705/1.1 |
| 2010/0185547 A1* | 7/2010 | Scholar | | G06Q 10/06 |
| | | | | 705/80 |
| 2010/0241466 A1* | 9/2010 | Chambers | | G06Q 10/06 |
| | | | | 705/4 |
| 2011/0106581 A1* | 5/2011 | Rohrbasser | | G06Q 30/02 |
| | | | | 705/7.29 |
| 2011/0261049 A1* | 10/2011 | Cardno | | G06Q 10/10 |
| | | | | 345/419 |
| 2011/0270748 A1* | 11/2011 | Graham, III | | G06Q 20/102 |
| | | | | 705/40 |
| 2013/0124478 A1* | 5/2013 | Ginzburg | | G06F 17/246 |
| | | | | 707/639 |
| 2013/0238491 A1* | 9/2013 | Bouey | | G06Q 20/405 |
| | | | | 705/39 |
| 2013/0238492 A1* | 9/2013 | Muthu | | G06Q 20/10 |
| | | | | 705/39 |
| 2013/0332324 A1* | 12/2013 | Mischell | | G06Q 40/06 |
| | | | | 705/30 |
| 2013/0332387 A1* | 12/2013 | Mirra | | G06Q 40/00 |
| | | | | 705/36 R |
| 2013/0332862 A1* | 12/2013 | Mirra | | G06Q 40/06 |
| | | | | 715/760 |
| 2014/0136381 A1* | 5/2014 | Joseph | | G06Q 40/02 |
| | | | | 705/35 |
| 2014/0351233 A1* | 11/2014 | Crupi | | G06F 16/24568 |
| | | | | 707/706 |
| 2015/0112866 A1* | 4/2015 | Muthu | | G06Q 20/385 |
| | | | | 705/44 |
| 2015/0332365 A1* | 11/2015 | Kassemi | | H04L 51/38 |
| | | | | 705/26.41 |
| 2016/0103923 A1* | 4/2016 | Thomas | | G06F 16/9535 |
| | | | | 715/234 |
| 2016/0321625 A1* | 11/2016 | Gilliam, III | | G06Q 20/023 |
| 2017/0124557 A1* | 5/2017 | Malliah | | G06Q 20/10 |
| 2018/0034824 A1* | 2/2018 | Maycotte | | H04L 67/1095 |
| 2018/0089258 A1* | 3/2018 | Bhattacharjee | | G06F 16/2425 |
| 2018/0089259 A1* | 3/2018 | James | | G06F 16/2282 |
| 2018/0089262 A1* | 3/2018 | Bhattacharjee | | G06F 16/24532 |
| 2018/0089269 A1* | 3/2018 | Pal | | G06F 16/24542 |
| 2018/0089278 A1* | 3/2018 | Bhattacharjee | | H04L 43/08 |
| 2018/0089306 A1* | 3/2018 | Pal | | G06F 16/3334 |

* cited by examiner

CENTRALIZED AUTHENTICATION AND REPORTING TOOL

TECHNICAL FIELD

This disclosure relates generally to network authentication and more specifically to a centralized authentication and reporting tool.

BACKGROUND

Servers and databases store information in the form of data. In some instances, users request to view data from the servers and databases. Retrieving data in response to the users request to present to the user may cause several technical challenges. Presenting data for a user may require transferring information across a network, thus creating security risks. It is desirable to provide the ability to securely transfer data to the user across a network to present to the user.

SUMMARY OF THE DISCLOSURE

According to an embodiment, a system includes a retrieval engine, an authentication engine, an extraction engine, a determination engine, and an export engine. The retrieval engine receives a request for a data report from a user via a user device. The request includes an indication to create the data report for customized data, wherein the customized data is a subset of reporting data. The request includes one or more report requirements indicating to generate the data report in one or more presentation formats. The request further includes an authentication token comprising authentication information for the user. The retrieval engine receives the reporting data from one or more data servers, wherein the reporting data comprises data entries and metadata, the metadata indicating a data entry type for one or more of the data entries. The authentication engine determines whether the user is authorized to receive the customized data based on the authentication token. The extraction engine configured to, upon a determination that the user is authorized to receive the customized data, extract the one or more report requirements from the request and extract the customized data from the reporting data based on the report requirements and the metadata. The determination engine determines one or more presentation generation tools based on the report requirements and the customized data. The determination engine generates a routine for each of the one or more presentation generation tools, the routine comprising the report requirements. The export engine communicates the customized data and the routine to the one or more presentation generation tools.

According to another embodiment, a method includes receiving a request for a data report from a user via a user device. The request includes an indication to create the data report for customized data, wherein the customized data is a subset of reporting data. The request further includes one or more report requirements indicating to generate the data report in one or more presentation formats. The request further includes an authentication token comprising authentication information for the user. The method further includes receiving the reporting data from one or more data servers, wherein the reporting data comprises data entries and metadata, the metadata indicating a data entry type for one or more of the data entries. The method further includes determining whether the user is authorized to receive the customized data based on the authentication token. The method further includes extracting the one or more report requirements from the request. The method further includes extracting the customized data from the reporting data based on the report requirements and the metadata. The method further includes determining one or more presentation generation tools based on the report requirements and the customized data. The method further includes generating a routine for each of the one or more presentation generation tools, the routine comprising the report requirements. The method further includes communicating the customized data and the routine to the one or more presentation generation tools.

According to yet another embodiment, a non-transitory computer-readable medium comprising software, the software when executed by one or more processing units operable to receive a request for a data report from a user via a user device. The request includes an indication to create the data report for customized data, wherein the customized data is a subset of reporting data. The request includes one or more report requirements indicating to generate the data report in one or more presentation formats. The request includes an authentication token comprising authentication information for the user. The software when executed by the one or more processing units is further operable to receive the reporting data from one or more data servers, wherein the reporting data comprises data entries and metadata, the metadata indicating a data entry type for one or more of the data entries and determine whether the user is authorized to receive the customized data based on the authentication token. The software when executed by the one or more processing units is further operable to extract the one or more report requirements from the request and extract the customized data from the reporting data based on the report requirements and the metadata. The software when executed by the one or more processing units is further operable to determine one or more presentation generation tools based on the report requirements and the customized data. The software when executed by the one or more processing units is further operable to generate a routine for each of the one or more presentation generation tools, the routine comprising the report requirements. The software when executed by the one or more processing units is further operable to communicate the customized data and the routine to the one or more presentation generation tools.

The present disclosure presents several technical advantages. In some embodiments, the system employs authentication tokens to allow data transfers to be executed using less information than other existing systems. By using less information to perform data transfers, the system reduces the amount of data that is communicated across the network. Reducing the amount of data that is communicated across the network improves the performance of the network by reducing the amount of time network resource are occupied. Additionally, authentication tokens are encoded or encrypted to obfuscate and mask information being communicated across a network. Masking the information being communicated protects users and their information in the event of unauthorized access to the network and/or data occurs.

In some embodiments, presentation generation tools are automatically selected to create a data report. This reduces human error associated with selecting presentation generation tools, thus reducing processing and memory requirements. In some embodiments, the system may select a plurality of presentation generation tools, allowing data reports to be created more efficiently, thus using a relatively small amount of network resources.

Automatically selecting presentation generation tools allows the tools to be upgraded within the network in some embodiments. For example, the system may not select a presentation generation tool that is offline for upgrades or repairs. The system may select one or more other suitable presentation generation tools for creating a data report.

Another technical advantage in some embodiments is ensuring that platform generation tools have adequate resources to create requested data reports. The system may receive requests to create data reports from a plurality of sources. In some embodiments, platform generation tool resources may be scare. The system may select one or more presentation generation tool based on, at least in part, the availability of the presentation generation tool.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
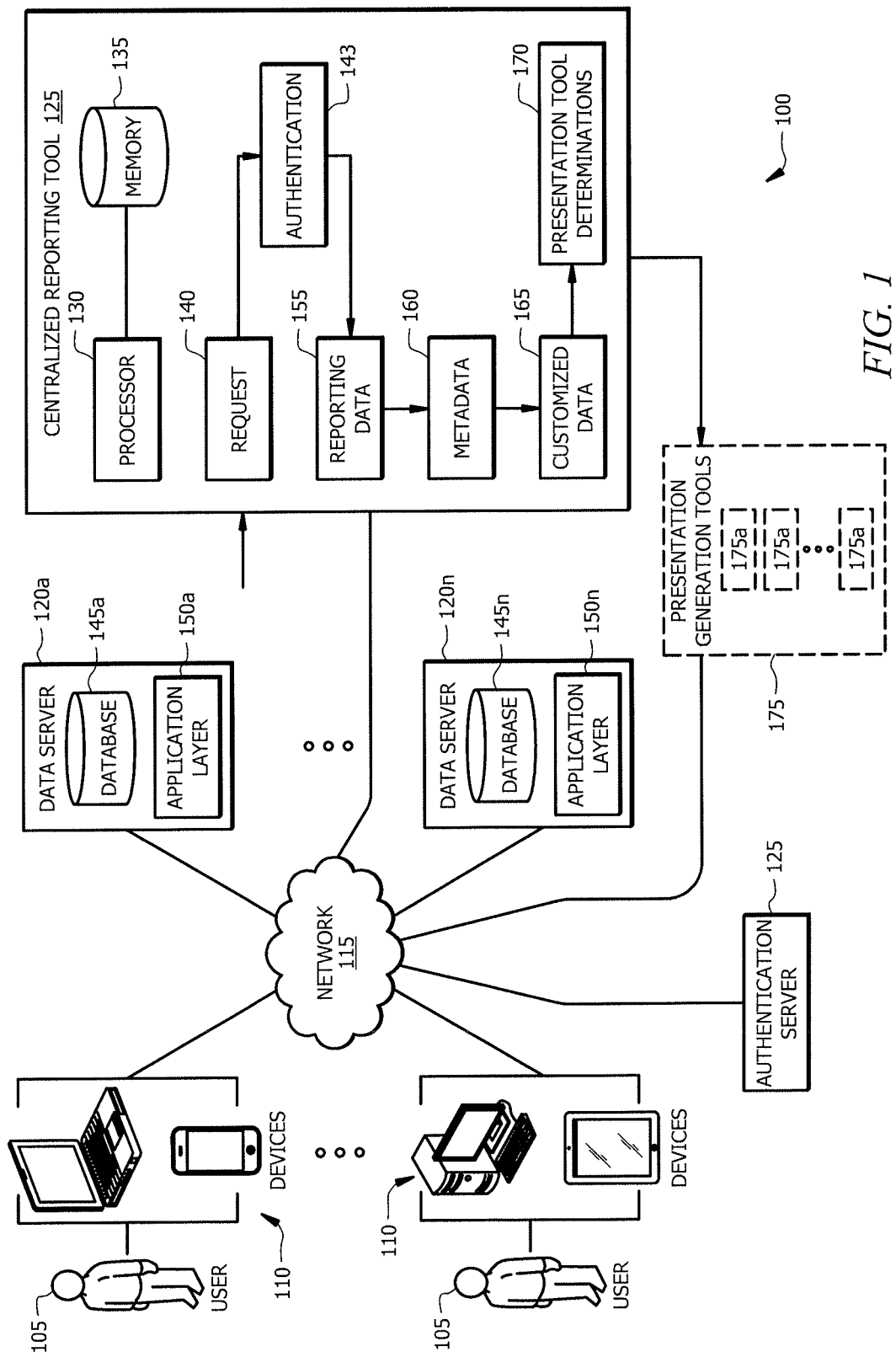
FIG. 1 illustrates a system for network authentication and data reporting.
Figure 2:
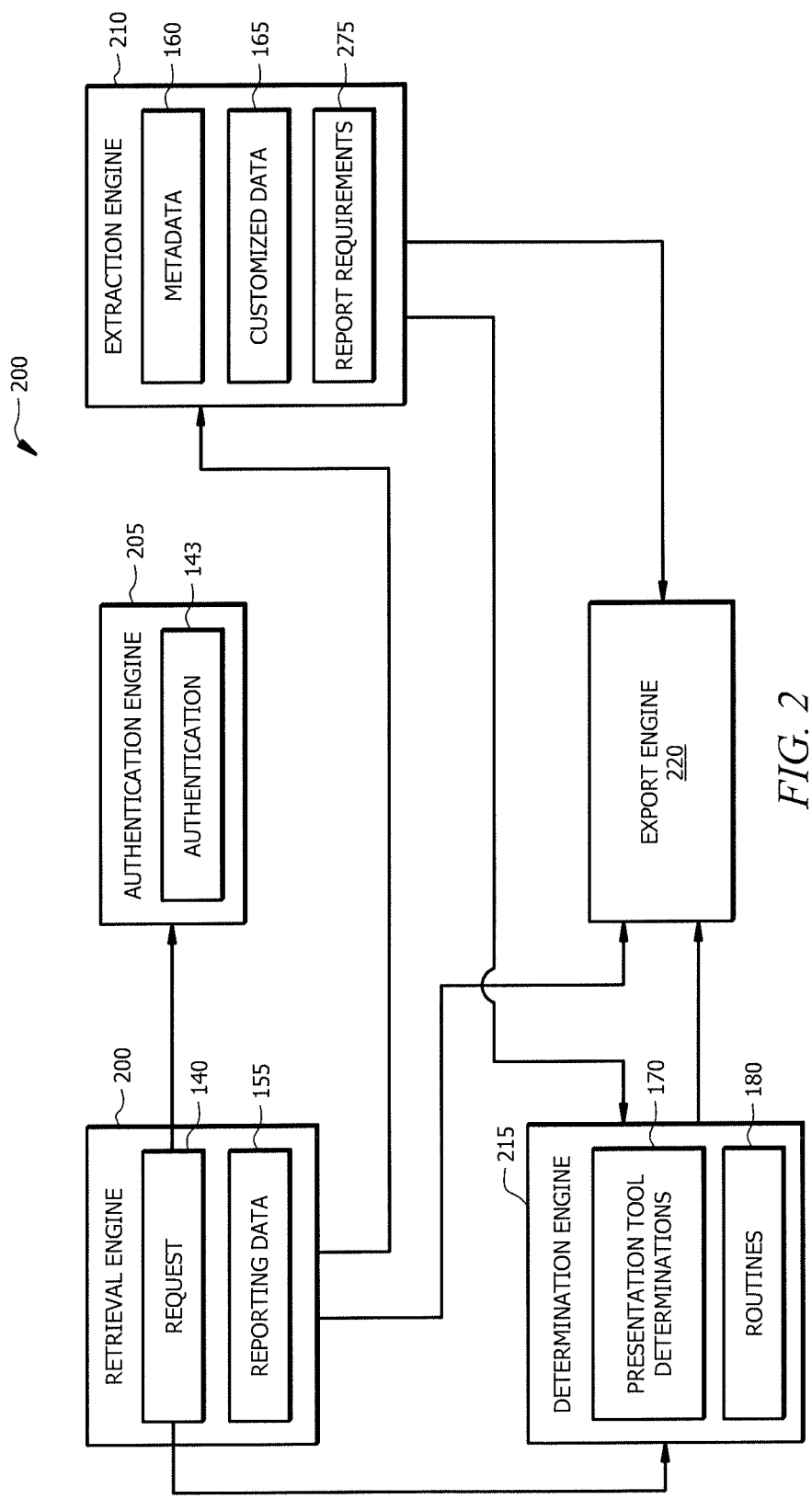
FIG. 2 illustrates the centralized reporting tool of the system of FIG. 1.
Figure 3:
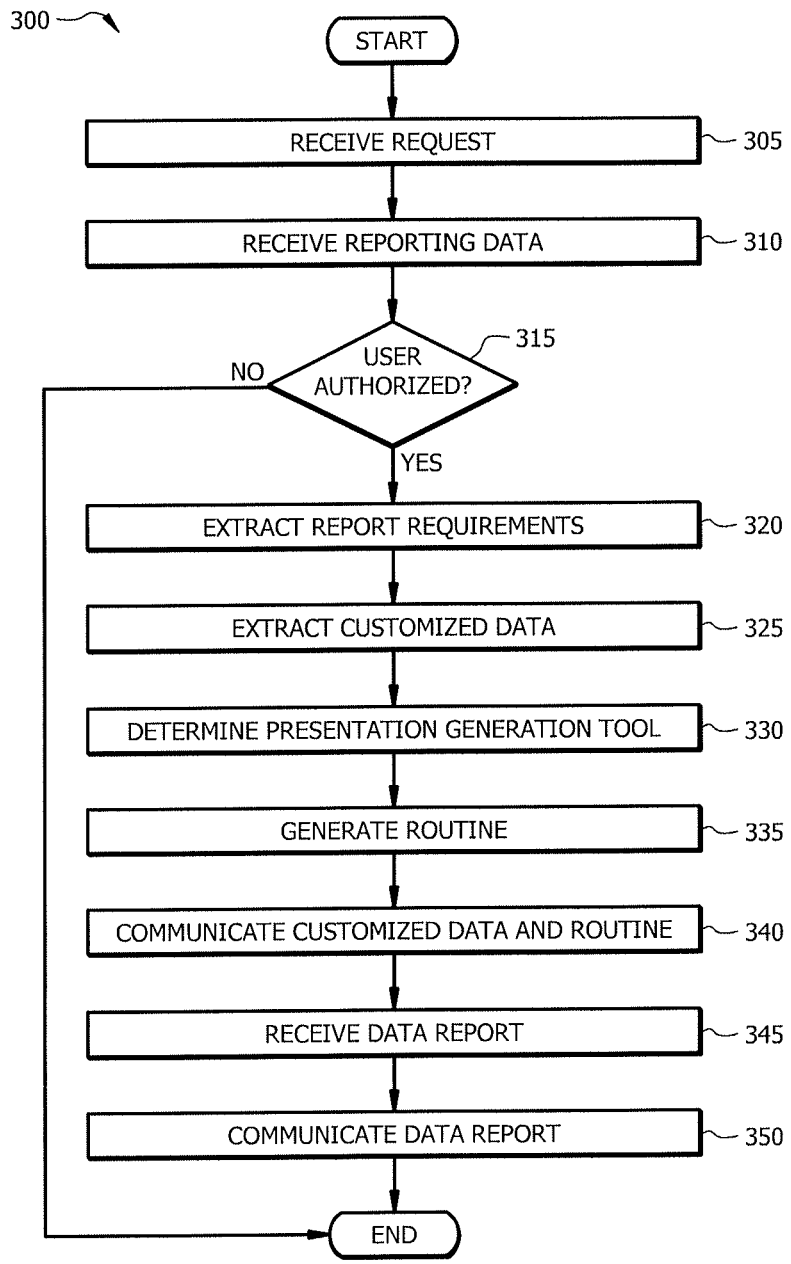
FIG. 3 is a flowchart illustrating a method for network authentication and data reporting using the system of FIG. 1.

Embodiments of the present disclosure and its advantages are best understood by referring to FIGS. 1 through 3 of the drawings, like numerals being used for like and corresponding parts of the various drawings.

Servers and databases store and use information in the form of data. Users may request to view summaries of data. Different users may use the summaries for different purposes, and different data summary presentations may be required for each different purpose. For example, different presentation types may include text data summaries and graphical data summaries. Graphical data summaries include bar graphs, line graphs, pie charts, and drop down menus. Further, the presentation may have different layouts, requiring different presentations in different places. Data reports may have a plurality of presentation types.

Presentation generation tools generate data reports. An enterprise may use a number of presentation generation tools to generate data reports. Different presentation generation tools may include different features and functionalities. For example, different presentation generation tools may have the capability to produce data reports in one or more particular presentation types. Thus, certain presentation generation tools are more suitable to create data reports with certain requirements. In traditional systems, a user may select a presentation generation tool to create a report based on the capabilities of the presentation generation tool. This has the disadvantage of requiring a user to know the capabilities of each presentation tool. Traditional systems do not leverage the capabilities of a plurality of presentation generation tools to create a data report. Additionally, traditional systems provide inadequate security measures for accessing data.

This disclosure contemplates a centralized reporting tool that automatically selects presentation generation tools to create a data report. The centralized reporting tool receives a request to create a data report, the request including one or more report requirements. The centralized reporting tool selects one or more presentation generation tools based on, at least in part, the report requirements. The selection is made based on, at least in part, the capabilities of the presentation generation tools.

In certain embodiments, the centralized reporting tool may determine whether the user is authorized to view data or data reports summarizing the data. For example, data may be restricted. The centralized reporting tool may receive an authentication token and use it to ensure that a user is authorized before communicating data or presenting a data report to the user.

FIG. 1 illustrates a system 100 for network authentication and data reporting. As illustrated in FIG. 1, system 100 includes devices 110 associated with users 105, a network 115, data servers 120, an authentication server 125, a centralized reporting tool 125, and presentation generation tools 175. In particular embodiments, system 100 increases network security of transferring and presenting data across network components.

In some embodiments, a user submits a request for a data report. For example, the user may be a human resources representative for an enterprise and may request to receive a summary of 401(k) information for the employees of the enterprise. The request may include instructions to present the information in a particular presentation format. For example, the request may include instructions to present the information in a pie chart. The user may log onto a landing page on an authentication server to submit the request. The authentication server may authenticate the user's identity and forward the request to a centralized reporting tool. The centralized reporting tool may receive the request and authenticate the user's identity to confirm that the user is authorized to view the data. The centralized reporting tool may retrieve data to generate the data report from one or more data servers. In some embodiments, the centralized reporting tool may extract the necessary data to generate the data report from the received data and determine one or more presentation tools capable of generating the data report. The centralized reporting tool may communicate data to the identified presentation generation tools along with instructions to generate the data report.

Devices 110 may be any devices that operate and/or communicate with other components of system 100. In general, devices 110 request data reports. For example, devices 110 communicate request 140 to authentication server 125, centralized reporting tool 125, or any other suitable component of system 100. Devices 110 may be associated with an enterprise or a business unit within an enterprise. Devices 110 and/or their associated enterprises may receive and display data reports. For example, enterprises, or any other suitable party, may collect data about the enterprise. Devices 110 may communicate a request for a data report that includes some or all of the data. For example, the data report may include a summary of the data.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100.

Device 110 may also include a user interface, such as a display, a microphone, keypad, or other appropriate terminal equipment usable by user 105. In some embodiments, an application executed by device 110 may perform the functions described herein.

Users 105 generally operate devices 110. Users 105 may be any suitable person who requests and/or receive data reports. For example, a user 105 may be associated with an enterprise. The user 105 may be in a business unit of the enterprise, such as a human resources department. This disclosure contemplates users 105 including any suitable person to review reports concerning any suitable type of data.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Authentication server 125 generally receives request 140 and authentication information from one or more user devices 110 and communicates request 140 and authentication information to data servers 120 and/or centralized reporting tool 125. For example, user 105, using device 110, may log on to authentication server 125. Authentication server 125 may present a landing page including a request for authentication information. For example, authentication server 125 may display a landing page that includes a request for a username and password. Authentication server 125 may authenticate user 105 by validating the username and password. For example, authentication server 125 may compare the username and password to a predetermined username and password. Once authentication server 125 authenticates the identity of user 105, authentication server 125 may receive request 140 from device 110 via user 105. As discussed in more detail below, request 140 is generally a request for a data report. Authentication server 125 may create an authorization token using the identification verification information. Verification server 125 communicates request 140 and/or the authorization token to data servers 120 and/or centralized reporting tool 125. Authentication server 125 may be any server known in the art. While illustrated as separate from other components, authentication server 125 may be part of one or more data servers 120, centralized reporting tool 125, and/or any other suitable component of system 100.

System 100 includes data servers 120a-n, where n represents any suitable number. For example, system 100 may include a single data server 120 or any number of data servers 120. Generally, data servers 120 receive requests for data and communicate data to centralized reporting tool 125 in response to the requests. In the illustrated embodiment, each data server 120 includes a database 145 and an application layer 150. Databases 145 store data to be processed. This disclosure contemplates databases 120 storing any suitable data type. For example, a first database 145a may store any accounting data. Accounting data may include stock option expenses data and 401(k) data. As another example, a second database 145b may include 401(k) expense data. 401(k) expense data may include a number of participants, a number of withdraws, pension plan information, a number of contributions, a number of dividends, and/or a number of fees. This disclosure is not limited to accounting data and/or 401(k) data. This disclosure contemplates database 145 storing any suitable type of data that facilitates generating data reports.

Each data server 120 may include application layer 150. Application layer 150 generally allows data server 120 to communicate with devices 110, authentication server 125, centralized reporting tool 125, and/or any other suitable component of system 100. For example, application layer 150 may facilitate receiving a request to create a data report from devices 110, authentication server, and/or any other suitable component of system 100. Application layer 150 may facilitate communicating data from database 145 to centralized report tool 125 or any other suitable component of system 125. For example, data server 120 may communicate data to centralized reporting tool 125 in response to a request from authentication server 125, devices 110, and/or centralized reporting tool 125.

Database 145 includes reporting data 155. Reporting data 155 is generally data used to generate data reports. In an embodiment, reporting data 155 includes accounting data. Accounting data may include stock option expenses and 401(k) expense data. In some embodiments, reporting data 155 includes 401(k) data that indicates a number of participants in a 401(k) program, a number of withdraws, pension plan information, a number of contributions, a number of dividends, and a number of fees associated with a 401(k) plan. Reporting data 155 is not limited to account data and 401(k) data. This disclosure contemplates reporting data 155 including any suitable type of data for creating data reports.

Centralized reporting tool 125 performs authentication and automatically selects presentation generation tools and thus increases network security and reduces network resource requirements. As illustrated in FIG. 1, centralized reporting tool 125 includes a processor 130 and memory 135. This disclosure contemplates processor 130 and memory 135 being configured to perform any of the operations of centralized reporting tool 125 described herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of centralized reporting tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of centralized reporting tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store data received from one or more data servers 120, data to facilitate the operation of centralized reporting tool 125, and/or any other suitable type of data. This disclosure contemplates memory 135 storing any of the elements stored in data servers 120, authentication server 125 and/or by centralized reporting tool 125.

In an exemplary embodiment, centralized reporting tool 125 receives request 140. Request 140 is generally a request for a data report. User 105 may generate request 140 using devices 110. Request 140 may include an indication to create a data report for customized data 165. Request 140 may further include one or more report requirements 275 indicating to generate the data report in or more presentation formats. Request 140 may include an authentication token including authentication information for user 105. For example, authentication server 125 may generate an authentication token and communicate it to centralized reporting tool 125 in request 140. Centralized reporting tool 125 may receive the request from authentication server 125, user device 110, and/or data server 120 as previously discussed. In an embodiment, data is presented to user 105 in the one or more requested presentation formats in response to request 140.

In response to request 140, centralized reporting tool 125 performs authentication 143. Centralized reporting tool 125 may receive an authentication token from authentication 125 or any other suitable component of system 100. Centralized reporting tool 125 may analyze the authentication token to determine whether user 105 is authorized to view data that will be included in the data report. For example, centralized reporting tool 125 may compare information within the authentication token to predetermined information.

Centralized reporting tool 125 receives reporting data 155 in response to request 140. Reporting data 155 is data that facilitates creating a data report. For example, a data report may include a summary of reporting data 155, a graph that includes data 155, and/or a dropdown menu that includes data 155. In some embodiments, reporting data 155 includes data entries and metadata. The metadata indicates a data entry type for one or more of the data entries. Centralized reporting tool 125 receives reporting data from one or more databases 145. Data servers 120 may communicate reporting data 155 to centralized reporting tool 125 in a flat file. As another example, data servers 120 may deploy a web service call in response to request 140 to communicate reporting data 155 to centralized reporting tool 125. As yet another example, centralized reporting tool 125 may communicate a request for reporting data 155 to data servers 120 in response to request 140.

Centralized reporting tool 125 may determine metadata 160 associated with reporting data 155. Generally, metadata 160 describes data entries of reporting data 155. For example, request 140 may include a request to generate a report based on a subset of data 155. Metadata 160 may be leveraged to determine and extract the subset of data.

In some embodiments, centralized reporting tool 125 uses metadata 160 and request 140 to generate customized data 165. Customized data 165 is data that is included in a data report. As discussed, customized data 165 is a subset of reporting data 155. Centralized reporting tool 125 may analyze request 140 to determine customized data 165. For example, request 140 may include a request for a summary of account balances for a group of employees. Reporting data 155 may include additional information associated with the accounts. Reporting tool 125 may extract account balance information from reporting data 155 to generate customized data 165. Centralized reporting tool 125 may use metadata 160 to extract customized data 165 from reporting data 155.

Centralized reporting tool 125 uses customized data 165 and request 140 to generate presentation tool determinations 170. Presentation tool determinations 170 indicate one or more presentation generation tools 175 to create a data report. Each presentation generation tool 175 may have different functionality. For example, presentation generation tools 175 may have the capability to present data in different presentation formats. Examples of presentation formats include data summaries, graphs (e.g., pie charts, bar graphs, line graphs, etc.), dropdown menus, and any other suitable method to present data summaries. In some embodiments, presentation generation tools 175 may only be able to generate data reports of certain data such as data in a certain format. Centralized reporting tool 125 analyzes request 140 to determine data report requirements such as presentation format requirements. Centralized reporting tool 125 analyzes customized data 165 to determine the data type of customized data 165. Centralized reporting tool 125 uses request 140 and customized data 165 to determine one more suitable presentation generation tools 175 to generate a data report based on request 140 and customized data 165.

In some embodiments, centralized reporting tool 125 generates routines 180 to communicate to presentation generation tools 175. Generally, a routine 180 includes instructions to presentation generation tools 175. For example routine 180 may communicate report requirements of request 140. Routine 180 may include customized data 165. Presentation generation tools 175 receive routine 180 and create a data report using routine 180. In some embodiments, presentation generation tools 175 may communicate the data report to centralized reporting tool 125. Centralized reporting tool 125 may communicate the data report to devices 110 or any other suitable component of system 100.

Modifications, additions, or omissions may be made to system 100 without departing from the scope of the invention. For example, system 100 may include any number of processors 130, memory 135, devices 110, and/or authentication servers 125. As a further example, presentation generation tools 175 may communicate data reports directly to devices 110 (e.g., not through centralized reporting tool 125).

FIG. 2 illustrates centralized reporting tool 125 of system 100 of FIG. 1, according to certain embodiments. As illustrated in FIG. 2, some embodiments of centralized reporting tool 125 include a retrieval engine 200, an authentication engine 205, an extraction engine 210, a determination engine 215, and an export engine 220. In particular embodiments, centralized reporting tool 125 increases network security and reduces network resource requirements.

Retrieval engine 200 receives request 140 and reporting data 155. In particular embodiments, retrieval engine 200 receives request 140 from one or more data servers 120. Retrieval engine may receive request 140 from user devices 110, authentication server 125, or any other suitable component of system 100. Request 140 generally includes an indication to create a data report for customized data 165. As previously discussed, centralized reporting tool 125 may receive reporting data 155 in a variety of manners. For example, data servers 120 may communicate reporting data 155, along with request 140, via a flat file or a web interface. As another example, centralized reporting tool 125 may receive request 140 and request reporting data 155 from data servers 120 in response to request 140. An example algorithm for retrieval engine 200 to receive request 140 is as follows: wait for request 140; receive request 140 from one or more data servers 120; in response to receiving request 140, retrieve reporting data 155 from database 120; send request 140 to authentication engine 205; and send reporting data 155 to extraction engine 210.

Authentication engine 205 receives request 140 and determines whether to generate a data report in response to request 140. Generally, authentication engine 205 determines whether user 105 is authorized to receive customized data 165. Data may be confidential and/or restricted. In some embodiments, only preapproved users 105 may view data reports containing reporting data 155 and/or customized data 165. Authentication engine may receive request 140 and extract the authentication token from request 140 to determine the user 105 who submitted the request. Authentication engine 205 may parse request 140 to determine reporting data 155 requested. Authentication engine 205 performs authentication 143 by determining whether the user 105 is authorized to receive customized data 165 based on the authentication token. An example algorithm for authentication engine 205 to perform authentication 143 is as follows: receive request 140 from retrieval engine 200; determine reporting data 155; extract authentication token from request 140; determine user 105; determine whether user 105 is authorized to view reporting data 155 and/or customized data 165; upon a determination that user 105 is authorized to view reporting data 155 and/or customized data 165, communicate the approval to extraction engine 210, determination engine 220, and/or export engine 220.

Upon a determination that user 105 is authorized to view the requested data, extraction engine 210 may extract report requirements 275 from request 140 and customized data 165 from reporting data 155 using metadata 160. As previously discussed, request 140 may include report requirements 275. For example, report requirements 275 may indicate the data to include in a data report and/or the presentation style of the data report. Extraction engine 210 may extract customized data 165 from reporting data 155. Customized data 165 is a subset of reporting data 155. Customized data 165 is used to facilitate generating a data report in response to request 140. An example algorithm for extraction engine 210 to extract report requirements 174 and customized data 165 is as follows: receive request 140; receive reporting data 155; extract report requirements 275 from request 140; determine customized data using report requirements 275 and metadata 160; extract customized data 165 from reporting data 155; communicate customized data 165 and report requirements 275 to determination engine 215.

Determination engine 215 receives report requirements 275 and customized data 165 and generates presentation tool determinations 170 and routines 180. Presentation tool determination 170 generally indicates which of the one or more presentation generation tools 175 to use to create a report based on report requirements 275. As previously discussed, different presentation generation tools 175 may have different features and functionalities. For example, different presentation generation tools 175 may accept data in different formats and/or generate data reports in different presentation formats. Determination engine 215 determines the data type of customized data 165 and analyzes report requirements 275 to generate presentation tool determinations 170. Presentation tool determinations 170 indicate the presentation generation tool(s) 175 to be used to generate a data report in response to request 170.

Determination engine 215 generates routines 180. Routines 180 include instructions to presentation generation tool(s) 175. For example, routines 180 may indicate a presentation format. Routines 180 include customized data 165. Determination engine 215 communicates routines 180 to export engine 220. An example algorithm for determination engine 215 to generate routines 180 is as follows: receive report requirements 275 and customized data 165; generate presentation tool determinations 170 based on report requirements 275 and customized data 165; generate routines 180 based on presentation tool determinations 170 and customized data 165; communicate routines 180 to export engine 220.

Export engine 220 generally communicates with presentation generation tools 175 and/or any other suitable component of system 100. Export engine 220 receives routines 180 and customized data 165, and communicates routines 180 and customized data 165 to presentation generation tools 175. In some embodiments, export engine 220 receives data reports from one or more presentation generation tools 175. Export engine 220 may communicate the data reports to user device 110 or any other suitable component of system 100. An example algorithm is as follows: receive routines 180 from determination engine 215; receive customized data 165 from extraction engine 210; communicate routines 180 and customized data 165 to one or more presentation generation tools 175; receive one or more data reports from presentation generation tools 175; communicate the data report to devices 110.

Modifications, additions, or omissions may be made to centralized reporting tool 125 without departing from the scope of the invention. For example, centralized reporting tool 125 may include any number of processors 130 and/or memories 135. As a further example, centralized reporting tool 125 may not create customized data 155. In this example, centralized reporting tool 125 operates using reporting data 155.

FIG. 3 is a flowchart illustrating a method 300 for performing user authorization and automatically selecting presentation generation tools using the system 100 of FIG. 1. In particular embodiments, centralized reporting tool 125 performs method 300. By performing method 300, centralized reporting tool 125 increases network security and reduces processing and memory demand in a data communication and storage environment.

Centralized reporting tool 125 begins by receiving request 140 to generate a data report at step 305. As previously discussed, user 105 may create request 140 using devices 110. Request 140 may include an indication to create a data report for customized data 165, wherein customized data 165 is a subset of reporting data 155. Request 140 may include one or more report requirements 275 indicating to generate the data report in one or more presentation formats.

In some embodiments, the request includes an authentication token including authentication information for a user 105 that submitted request 140.

In step 310, centralized reporting tool 125 receives reporting data 155. For example, centralized reporting tool 125 may receive reporting data 155 from database 145 of data server 120. Reporting data may include data entries and metadata 160. Metadata 160 may indicate a data entry type for one or more of the data entries.

In step 315, centralized reporting tool 125 performs authentication 143 to determine whether user 105 is authorized to view customized data 165 based on the authentication token. If user 105 is not authorized to view the data, method 300 ends.

If user 105 is authorized to view customized data at step 315, method 300 proceeds to step 320 where centralized reporting tool 125 extracts report requirements 275 from request 140. At step 325, centralized reporting tool 125 extracts customized data 165 from reporting data 155 based on the report requirements and metadata 160.

In step 330, centralized reporting tool 125 determines one or more presentation generation tools 175 based on the report requirements 275 and customized data 165. Centralized reporting tool 125 generates routine 180 for each of the one or more presentation generation tools 175 at step 335. Routine 180 may include report requirements 275. Generally, routine 180 instructs the one or more presentation generation tools to create a data report.

In step 340, centralized reporting tool 125 communicates customized data 165 and routine 180 to the one or more presentation generation tools 175. Centralized reporting tool 125 receives the data report from the one or more presentation generation tools 175 at step 345 before communicating the data report to devices 100 and/or any other suitable component of system 100 at step 350.

Modifications, additions, or omissions may be made to method 300 depicted in FIG. 3. Method 300 may include more, fewer, or other steps. For example, steps may be performed in parallel or in any suitable order. While discussed as centralized reporting tool 125 performing the steps, any suitable component of system 100 may perform one or more steps of the method. As another example, centralized reporting tool 125 may select any number of presentation generation tools 175 to generate a data report in response to request 140. In this example, centralized reporting tool 125 may generate a first routine 180 for a first presentation generation tools 175 and a second routine 180 for a second presentation generation tool 175. While this disclosure may discuss creating data reports customized data 155, system 100 may create data reports using reporting data 155 or any other suitable data.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
    a user device; and
    a reporting tool comprising a hardware processor configured to implement:
        a retrieval engine configured to:
            receive a request for a data report from a user via the user device, the request comprising:
                an indication to create the data report for customized data, wherein the customized data is a subset of reporting data;
                one or more report requirements indicating to generate the data report in one or more presentation formats; and
                an encrypted authentication token comprising authentication information for the user, the request is not received until the authentication information is received; and
            receive the reporting data from one or more data servers, wherein the reporting data comprises data entries and metadata, the metadata indicating a data entry type for one or more of the data entries, the reporting data further comprising accounting data comprising stock option expenses and 401(k) expense data and 401(k) data comprising indicating a number of participants, a number of withdraws, pension plan information, a number of contributions, a number of dividends, and a number of fees;
        an authentication engine configured to:
            determine whether the user is authorized to receive the customized data based on the authentication token; and
            determine, based on the authentication token that the customized data should be restricted;
        an extraction engine configured to, upon a determination that the user is authorized to receive the customized data:
            extract the one or more report requirements from the request;
            in response to the determination that the customized data should be restricted, determine a first portion of the customized data that should be restricted; and
            extract a second portion of the customized data from the reporting data but not the first portion based on the report requirements and the metadata;
        a determination engine configured to:
            determine that the customized data is of a first data type;
            determine that a first presentation tool accepts data of the first data type and generates reports in the one or more presentation formats;
            determine that a second presentation tool accepts data of a second data type and generates reports in a second presentation format;
            in response to the determination that the first presentation tool accepts data of the first data type and generates reports in the one or more presentation formats and the determination that the second presentation tool accepts data of the second data type and generates reports in the second presentation format, select the first presentation generation tool;
            generate a routine for the first presentation generation tool, the routine comprising the report requirements; and
        an export engine configured to communicate the customized data and the routine to the first presentation generation tool in response to the selection of the first presentation generation tool, the first presentation generation tool configured to generate a report that includes the customized data, the export engine further configured to communicate the report to the user device, the user device configured to display the report to the user.

2. The system of claim 1, wherein the export engine is further configured to:
communicate the customized data and the routine to the second presentation generation tool, the second presentation generation tool configured to generate a second report that includes the customized data; and
communicate the second report to the user device, the user device configured to display the second report to the user.

3. The system of claim 1, wherein:
the determination engine is further configured to generate a first routine for the first presentation generation tool and a second routine for the second presentation generation tool; and
the export engine is further configured to:
communicate at least part of the customized data and the first routine to the first presentation generation tool; and
communicate at least part of the customized data and the second routine to the second presentation generation tool.

4. The system of claim 1, wherein the presentation formats comprise a summary format, a graph format, and a drill-down format.

5. The system of claim 4, wherein the graph format comprises one of a pie chart format, a bar graph format, and a line graph format.

6. The system of claim 1, wherein the routine further comprises an instruction to the first presentation generation tool.

7. A method comprising:
receiving a request for a data report from a user via a user device, the request comprising:
an indication to create the data report for customized data,
wherein the customized data is a subset of reporting data;
one or more report requirements indicating to generate the data report in one or more presentation formats; and
an encrypted authentication token comprising authentication information for the user, the request is not received until the authentication information is received;
receiving the reporting data from one or more data servers, wherein the reporting data comprises data entries and metadata, the metadata indicating a data entry type for one or more of the data entries, the reporting data further comprising accounting data comprising stock option expenses and 401(k) expense data and 401(k) data comprising indicating a number of participants, a number of withdraws, pension plan information, a number of contributions, a number of dividends, and a number of fees;
determining whether the user is authorized to receive the customized data based on the authentication token;
determining, based on the authentication token that the customized data should be restricted;
upon a determination that the user is authorized to receive the customized data:
extracting the one or more report requirements from the request;
in response to the determination that the customized data should be restricted, determining a first portion of the customized data that should be restricted; and
extracting a second portion of the customized data from the reporting data but not the first portion based on the report requirements and the metadata;
determining that the customized data is of a first data type;
determining that a first presentation tool accepts data of the first data type and generates reports in the one or more presentation formats;
determining that a second presentation tool accepts data of a second data type and generates reports in a second presentation format;
in response to the determination that the first presentation tool accepts data of the first data type and generates reports in the one or more presentation formats and the determination that the second presentation tool accepts data of the second data type and generates reports in the second presentation format, selecting the first presentation generation tool;
generating a routine for the first presentation generation tool, the routine comprising the report requirements;
communicating the customized data and the routine to the first presentation generation tool in response to the selection of the first presentation generation tool;
generating a report that includes the customized data;
communicating the report to the user device; and
displaying the report to the user.

8. The method of claim 7, further comprising to:
communicating the customized data and the routine to the second presentation generation tool;
generating a second report that includes the customized data;
communicating the second report to the user device; and
displaying the second report to the user.

9. The method of claim 7, further comprising:
generating a first routine for the first presentation generation tool and the second routine for a second presentation generation tool;
communicating at least part of the customized data and the first routine to the first presentation generation tool; and
communicating at least part of the customized data and the second routine to the second presentation generation tool.

10. The method of claim 7, wherein the presentation formats comprise a summary format, a graph format, and a drill-down format.

11. The method of claim 10, wherein the graph format comprises one of a pie chart format, a bar graph format, and a line graph format.

12. The method of claim 7, wherein the routine further comprises an instruction to the first presentation generation tool.

13. A non-transitory computer-readable medium comprising software that when executed by a hardware processor causes the hardware processor to:
receive a request for a data report from a user via a user device, the request comprising:
an indication to create the data report for customized data,
wherein the customized data is a subset of reporting data;
one or more report requirements indicating to generate the data report in one or more presentation formats; and
an encrypted authentication token comprising authentication information for the user, the request is not received until the authentication information is received;

receive the reporting data from one or more data servers, wherein the reporting data comprises data entries and metadata, the metadata indicating a data entry type for one or more of the data entries, the reporting data further comprising accounting data comprising stock option expenses and 401(k) expense data and 401(k) data comprising indicating a number of participants, a number of withdraws, pension plan information, a number of contributions, a number of dividends, and a number of fees;

determine whether the user is authorized to receive the customized data based on the authentication token;

determine, based on the authentication token that the customized data should be restricted;

upon a determination that the user is authorized to receive the customized data:
  extract the one or more report requirements from the request;
  in response to the determination that the customized data should be restricted, determine a first portion of the customized data that should be restricted; and
  extract a second portion of the customized data from the reporting data but not the first portion based on the report requirements and the metadata;

determine that the customized data is of a first data type;

determine that a first presentation tool accepts data of the first data type and generates reports in the one or more presentation formats;

determine that a second presentation tool accepts data of a second data type and generates reports in a second presentation format;

in response to the determination that the first presentation tool accepts data of the first data type and generates reports in the one or more presentation formats and the determination that the second presentation tool accepts data of the second data type and generates reports in the second presentation format, select the first presentation generation tool;

generate a routine for the first presentation generation tool, the routine comprising the report requirements;

communicate the customized data and the routine to the first presentation generation tool in response to the selection of the first presentation generation tool, the first presentation generation tool configured to generate a report that includes the customized data; and communicate the report to the user device, the user device configured to display the report to the user.

14. The medium of claim 13, the software when executed causes the hardware processor to further:

communicate the customized data and the routine to the second presentation generation tool, the second presentation generation tool configured to generate a second report that includes the customized data; and communicate the second report to the user device, the user device configured to display the second report to the user.

15. The medium of claim 13, the software when executed causes the hardware processor to further:

generate a first routine for the first presentation generation tool and the second routine for a second presentation generation tool;

communicate at least part of the customized data and the first routine to the first presentation generation tool; and communicate at least part of the customized data and the second routine to the second presentation generation tool.

16. The medium of claim 13, wherein the presentation formats comprise a summary format, a graph format, and a drill-down format.

17. The medium of claim 13, wherein the graph format comprises one of a pie chart format, a bar graph format, and a line graph format.

* * * * *